United States Patent
Chang et al.

(10) Patent No.: US 8,040,927 B2
(45) Date of Patent: Oct. 18, 2011

(54) RING OR LINEAR CAVITY OF ALL-FIBER-BASED ULTRA SHORT PULSE LASER SYSTEM AND METHOD OF OPERATING THE SAME

(75) Inventors: Yao-Wen Chang, Chiayi (TW); Chien-Ming Huang, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/725,292

(22) Filed: Mar. 16, 2010

(65) Prior Publication Data

US 2011/0158265 A1    Jun. 30, 2011

(30) Foreign Application Priority Data

Dec. 30, 2009    (TW) ............................... 98145761 A

(51) Int. Cl.
*H01S 3/30* (2006.01)
(52) U.S. Cl. .................. 372/6; 372/11; 372/69; 372/94; 372/108
(58) Field of Classification Search ................ 372/6, 11, 372/69, 94
See application file for complete search history.

(56) References Cited

U.S. PATENT DOCUMENTS

| 6,097,741 | A | 8/2000 | Lin et al. |
| 7,317,740 | B2 | 1/2008 | Peng et al. |
| 7,477,664 | B2 | 1/2009 | Liu |
| 2010/0296527 | A1* | 11/2010 | Nicholson ........................ 372/6 |
| 2011/0075686 | A1* | 3/2011 | Liu ................... 372/6 |

* cited by examiner

*Primary Examiner* — Dung Nguyen

(57) ABSTRACT

A ring-cavity or linear-cavity all-fiber-based ultra short pulse laser system and method of operating the same are provided. The all-fiber-based ultra short pulse laser system includes a pulse pump light source, a gain fiber, a first fiber signal pump combining unit, a broadband optical isolator, a fiber saturable absorber, an assistant light source, a second fiber signal pump combining unit, and a light coupling output. The first fiber signal pump combining unit is respectively connected to the pulse pump light source and the gain fiber to emit broadband amplified spontaneous emission, then the broadband amplified spontaneous emission passes through the broadband optical isolator. The second fiber signal pump combining unit is respectively connected to the assistant light source and the fiber saturable absorber. An ASE signal actively provides passive mode locking of the cavity, and the light coupling output partially outputs the laser. A dispersion fiber controls the temporal width.

17 Claims, 6 Drawing Sheets

RING OR LINEAR CAVITY OF ALL-FIBER-BASED ULTRA SHORT PULSE LASER SYSTEM AND METHOD OF OPERATING THE SAME

CROSS REFERENCE TO RELATED APPLICATIONS

This application claims priority of Taiwan Patent Application No. 98145761, filed on Dec. 30, 2009, the entirety of which is incorporated by reference herein.

BACKGROUND OF THE INVENTION

1. Field of the Invention

The disclosure relates to an all-fiber-based laser system. The disclosure relates to an all-fiber-based laser system which can actively control passive mode locking.

2. Description of the Related Art

A pulse fiber laser has potential to be used in applications such as; machining of solid and brittle material, in medical examinations and in wavelength transformation. Maximum peak power output is mainly provided by an active nanosecond fiber laser and a passive mode locked laser. However, the above two lasers have the following disadvantages. The peak power of the active nanosecond fiber laser is not provided efficiently enough for machining of solid and brittle material. Furthermore, because the pulse duration is longer than a picosecond or a femtosecond of a short pulse, a great deal of heat is generated. The passive mode locked laser is easily affected by environment, is costly and can not be actively modulated, thus, it is not available for laser machining.

A conventional all-fiber-based high peak power nanosecond pulse laser uses a master oscillator power amplifier, MOPA. The MOPA with a seed and a multi-stage amplifier, and a plurality of light isolators are assembled to form a high peak fiber laser. However, when the pump light power is out of proportion to the seed power, the pump light is emitted to an Yb doped gain fiber, and a non-directive amplified spontaneous emission, ASE is generated. The ASE is suppressed to prevent the laser from proceeding along a former path to damage the seed. Because the all-fiber-based laser is serially connected via melt, prevention of ASE is more important.

Outer shell electrons of the Yb doped fiber are easily ionized and raised to a upper energy level and fast decay to meta-stable state. If the seed power is not enough, the power of the pump light increases, and disturbs the gain fiber, a spontaneous pulse is generated in a instant short time. The pump light can not enter the disturb bent fiber in a transient state. When gain fiber is interfered, energy is provided for the fiber laser to generate a spontaneous pulse in a very short time. The pulse repetition frequency is related to the lifetime of the Yb doped fiber. The lifetime of the Yb doped fiber is around 850 μsec.

FIG. 1 is a schematic view of a conventional mode locked fiber laser. Referring to FIG. 1, FIG. 1 is U.S. Pat. No. 7,317, 740 "MODE LOCKER FOR FIBER LASER". The mode locked laser includes a laser unit 100, a mode locker 104, two collimators 104a and 104c, a pillar-shaped structure 104b, a rotator structure 104d, a light coupler 106, a gain fiber 102, and a wavelength division multiplexer 108. The laser unit 100, the mode locker 104, the light coupler 106, the gain fiber 102 and the wavelength division multiplexer 108 are connected in sequence. The mode locked laser is not an all-fiber-based laser, and the mode locker 104 is adjusted by a mechanism.

FIG. 2 is a schematic view of a conventional mode locked fiber laser. Referring to FIG. 2, FIG. 2 is U.S. Pat. No. 7,477, 664 "Nonlinear Polarization pulse shaping mode locked fiber laser". The mode locked fiber laser 200' comprises a wavelength division multiplexer 210', an Yb doped fiber 205, a coupler 230, a fiber output 225, two polarization controllers 204-1' and 240-2', a linear polarization isolator 235'. The wavelength division multiplexer 210', the Yb doped fiber 205, the coupler 230, the fiber output 225, the polarization controller 240-2', the linear polarization isolator 235', and the polarization controller 204-1' are connected in sequence. However, the mode locked fiber laser 200' must be switched to lock mode by a mechanism, and the mode locked fiber laser 200' is sensitive to the environment, thus, the mode locked fiber laser 200' is unstable. Furthermore, the mode locked fiber laser 200' does not actively modulate.

FIG. 3 is a schematic view of a conventional mode locked fiber laser. Referring to FIG. 3, FIG. 3 is U.S. Pat. No. 6,097, 741 "Passive mode-locked fiber lasers". A fiber laser 300 includes a first reflector 310 with a grating 312 and a collimator 314, a gain material 330, a fiber coupler 340, a fiber 342, three fiber portions 340a, 340b and 344, two sections 364 and 362, a pump light 350, a fiber output coupler 360, a light isolator 370, a collimator 321, a lens 323, a saturable absorber 325 and a second reflector 326. This design is very complicated and needs many optical elements. The fiber laser 300 must be adjusted to lock mode by mechanism, and the fiber laser 30 is sensitive to the environment, thus, the fiber laser 30 is unstable. Furthermore, the fiber laser 30 does not actively modulate.

BRIEF SUMMARY OF THE INVENTION

The embodiment provides a ring or linear cavity all-fiber-based ultra short pulse laser system comprising a pulse pump light source, a gain fiber, a first fiber signal pump combining unit, a broadband optical isolator, a fiber saturable absorber, an assistant light source with long wavelength, a second fiber signal pump combining unit, and a group velocity dispersion control fiber. The first fiber signal pump combining unit is a signal pump light coupler. The signal pump light coupler is connected to the pulse pump light source and the gain fiber to generate a broadband ASE to pass through the broadband optical isolator. The second fiber signal pump combining unit is a cavity output light coupler. The high gain saturable absorber is connected to the assistant light source. The broadband ASE light source signal actively controls the cavity passive mode locking. Finally, the light coupler partially outputs a laser. The dispersion fiber controls the pulse duration.

The another embodiment provides a linear all-fiber-based laser system comprising a pulse pump light source, a first fiber signal pump combining unit, a gain fiber, a positive dispersion fiber, a negative dispersion fiber, a broadband optical isolator, a low-pass filter, a saturable absorber, a second fiber signal pump combining unit, an assistant light source, and a light coupling output. The first fiber signal pump combining unit is connected to the pulse pump light source. The gain fiber is connected to the first fiber signal pump combining unit. The positive dispersion fiber is connected to the gain fiber. The broadband optical isolator is connected to the first fiber signal pump combining unit connected to the pulse pump light source. The low-pass filter is connected to the broadband optical isolator. The saturable absorber is connected to the low-pass filter. The second fiber signal pump combining unit is connected to the saturable absorber, the negative dispersion fiber, and the assistant light source. The light coupling output is connected to the negative dispersion fiber.

The another embodiment provides a method of operating an all-fiber-based ultra short pulse laser system. The steps comprise providing an all-fiber-based ultra short pulse laser system having a pulse pump light source, a fiber saturable absorber, an assistant light source, at least a dispersion fiber, and a light coupling output; generating a broadband ASE via the pulse pump light source; making the all-fiber-based ultra short pulse laser system to achieve a passive mode locking via the fiber saturable absorber; decreasing a restoring period of the fiber saturable absorber via the assistant light source; providing dispersion compensation via the dispersion fiber to output an ultra short pulse; and partially outputting a laser passing through the all-fiber-based ultra short pulse laser system via the light coupling output.

BRIEF DESCRIPTION OF THE DRAWINGS

The embodiment can be more fully understood by reading the subsequent detailed description and examples with references made to the accompanying drawings, wherein.

DETAILED DESCRIPTION OF THE EMBODIMENTS

Figure 1:
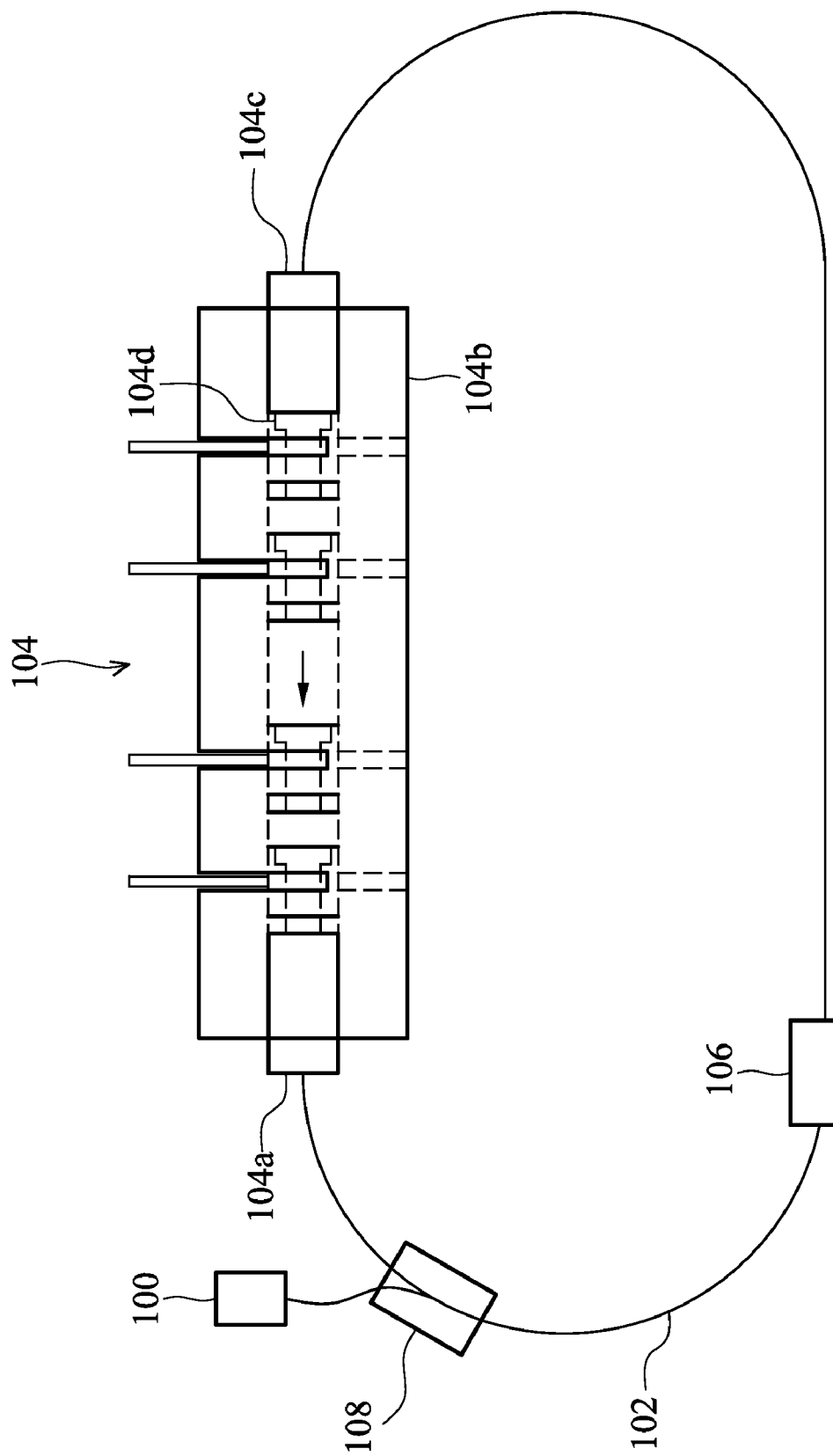
FIG. 1 is a schematic view of a conventional mode locked fiber laser.
Figure 2:
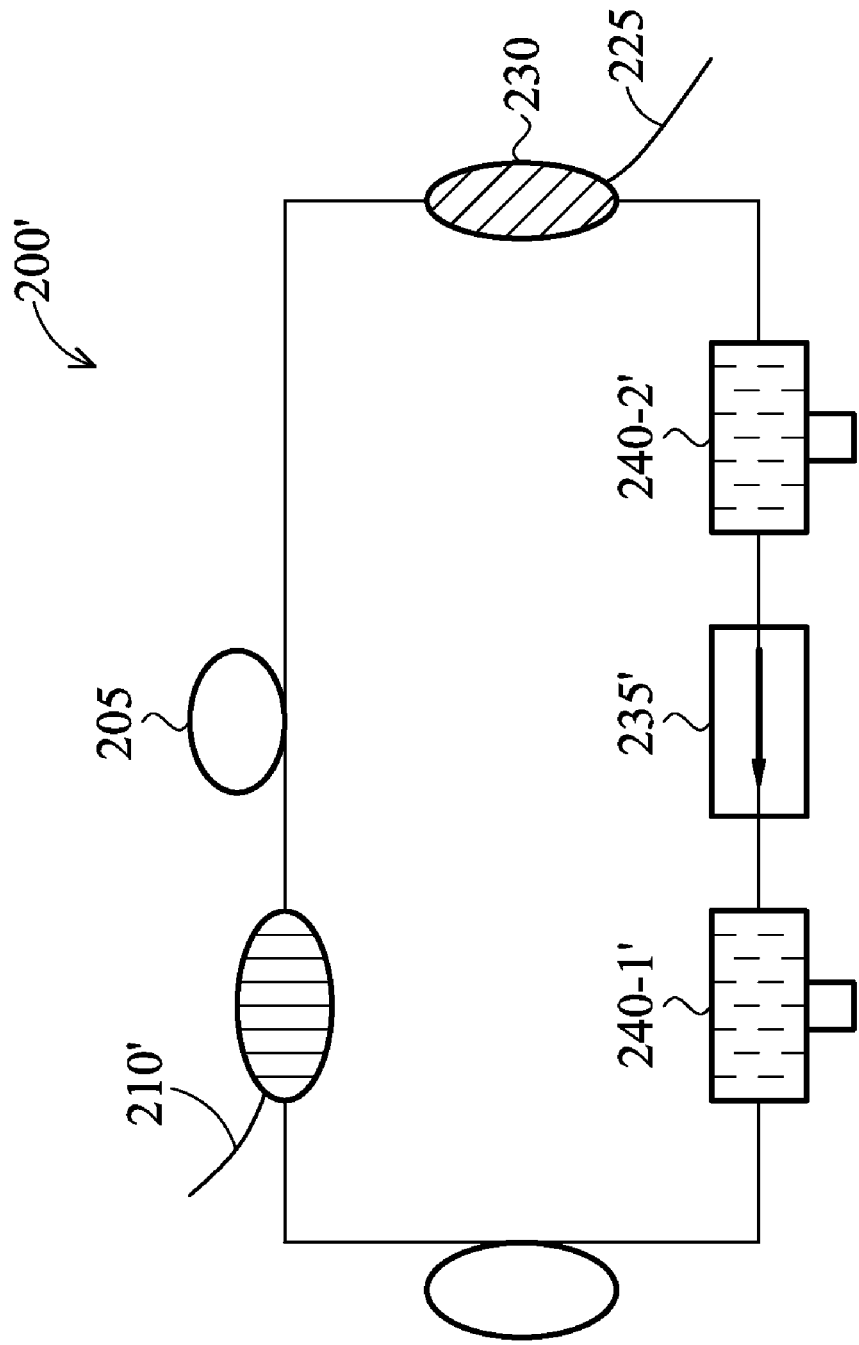
FIG. 2 is a schematic view of a conventional mode locked fiber laser.
Figure 3:
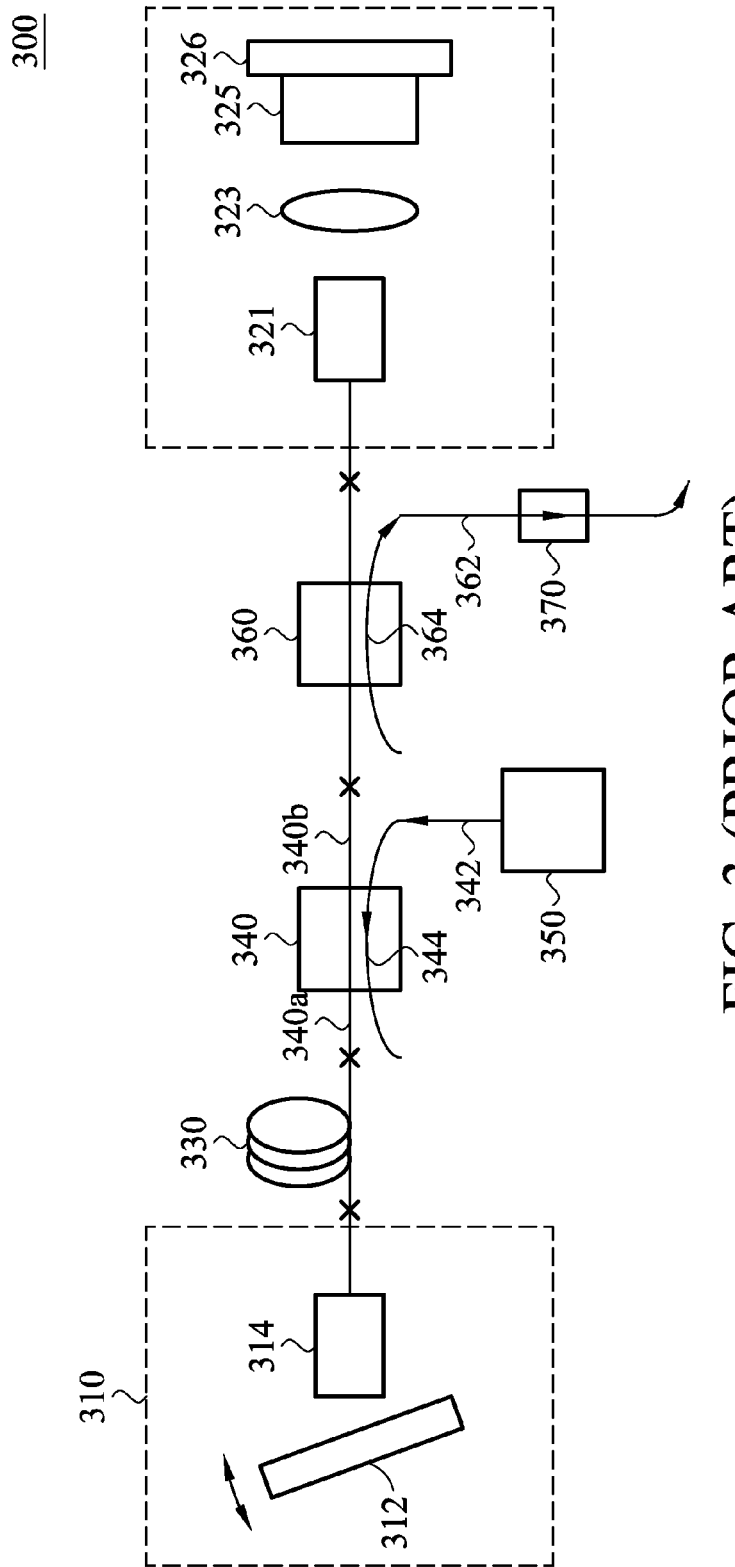
FIG. 3 is a schematic view of a conventional mode locked fiber laser.
Figure 4:
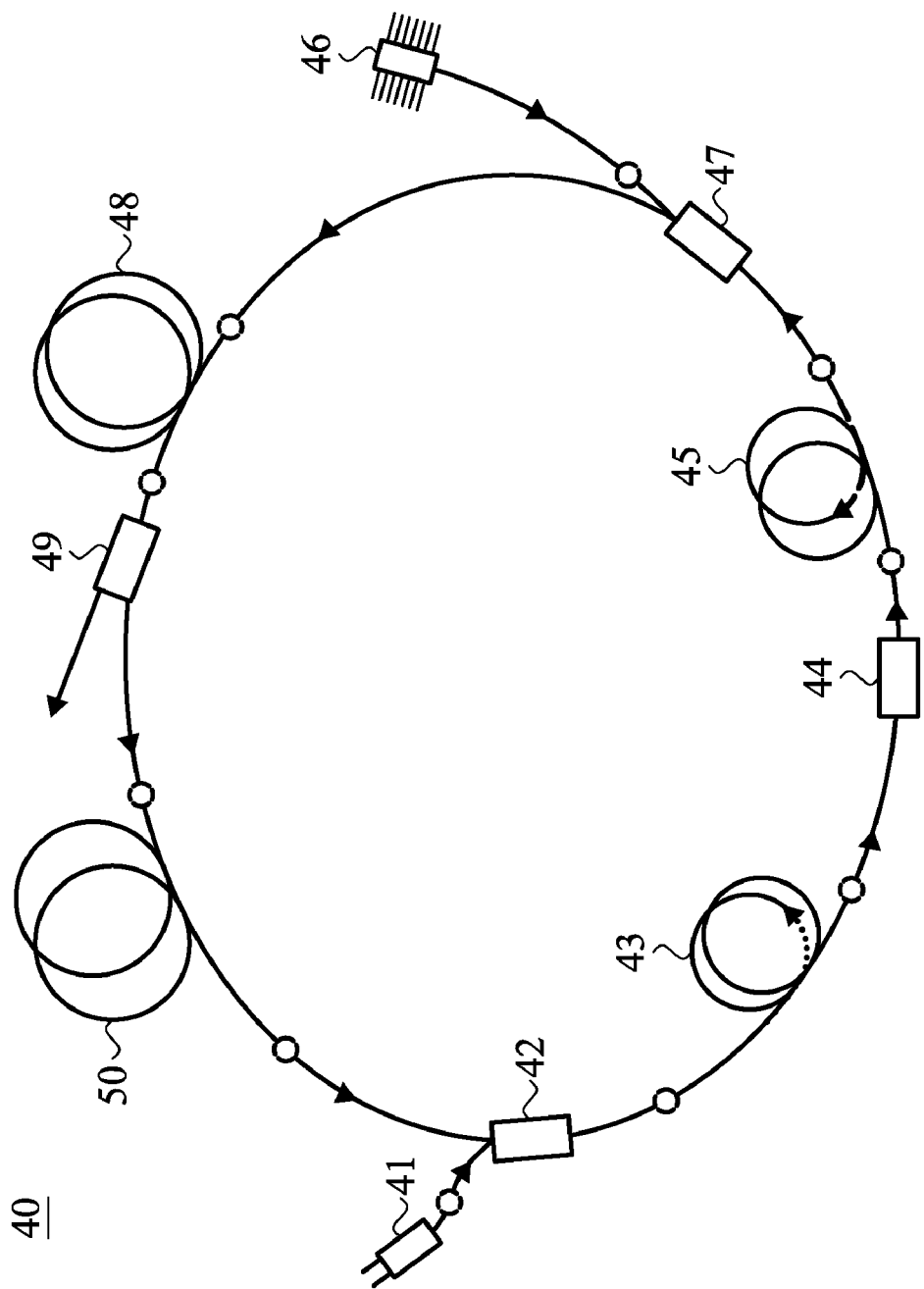
FIG. 4 is a schematic view of a ring-cavity all-fiber-based ultra short pulse laser system.

Referring to FIG. 4, a ring-cavity all-fiber-based ultra short pulse laser system 40 comprises a pulse pump light source 41, a first fiber signal pump combining unit 42, a gain fiber 43, a broadband optical isolator 44, a saturable absorber 45, an assistant light source 46, a second fiber signal pump combining unit 47, two dispersion fibers 48 and 50, and a light coupling output 49. The first fiber signal pump combining unit 42, the gain fiber 43, the broadband optical isolator 44, the saturable absorber 45, the second fiber signal pump combining unit 47, the dispersion fiber 48, the light coupling output 49 and the dispersion fiber 50 are connected in sequence to form a ring structure. The pulse pump light source 41 is connected to the first fiber signal pump combining unit 42. The assistant light source 46 is connected to the second fiber signal pump combining unit 47. In an embodiment, the first fiber signal pump combining unit 42 is a light coupler. The second fiber signal pump combining unit 47 is a wavelength multiplexer.

In the embodiment, the pulse pump light source 41 outputs a pump light. The wavelength of the pump light ranges from 790 to 820 nm, from 900 to 930 nm, or 960 to 990 nm. In the embodiment, the wavelength of the pump light is 975 nm. After the pulse pump light source 41 outputs a pump light to pass through the first fiber signal pump combining unit 42 (light coupler) and the gain fiber 43, the pump light arrives at the broadband optical isolator 44. After the pump light passes through the first fiber signal pump combining unit 42 (light coupler) and the gain fiber 43, the pulse pump light source 41 limits the light-outputting period of the pump light source from about 100 μsec (1/10 of life span of Yb) to 1000 μsec. The photons that do not return in a steady state have the greatest bandwidth of all photons, thus, the wavelength the pump light ranges from 1010 to 1070 nm. The wide band ASE with 1035 nm wavelength is an embodiment. Then, the wide band ASE enters the broadband optical isolator 44. The broadband optical isolator 44 prevents residuary pump light from entering the saturable absorber 45 and backward entering the gain fiber 43. The gain fiber 43 may be an ytterbium (Yb) doped fiber, an erbium (Er) doped fiber, a praseodymium (Pr) doped fiber, a thulium (Tm) doped fiber and a holmium (Ho) doped fiber. In the embodiment, the gain fiber 43 is an ytterbium (Yb) doped fiber. Note that the broadband optical isolator 44 may be a Faraday magneto-Optic crystal or the assembly of a multi-mode pump isolator and a low-pass filter. In the embodiment, the broadband optical isolator 44 is a Faraday magneto-Optic crystal.

This embodiment utilizes a high gain Yb doped fiber being the saturable absorber 45 to switch passive mode locking. In the spectrum of the high gain Yb doped fiber, the high gain Yb doped fiber with 1035 nm wavelength has a special overlapping character, reaching the threshold of the saturable absorber fiber. At this time, the saturable absorber fiber becomes transparent (that is the loss of the cavity decreases), and emits a steady mode locked ultra short pulse.

The assistant light source 46 is provided to decrease the time of the photons in a transient state dropping from the high energy level. The outputted ultra short pulse laser can adjust the repetition of the pulse, and the pulse pump light source 41 and the assistant light source 46 are modulated at the same time to decrease the restoring period of the saturable absorber 45, decreasing the repetition of the pulse. The wavelength of the assistant light source 46 ranges from 1060 to 1100 nm. In the embodiment, the wavelength of the assistant light source 46 is 1064 nm. The broadband ASE light source signal actively controls the passive mode locking of the cavity. The second fiber signal pump combining unit 47 partially outputs the laser.

The dispersion fiber includes a positive dispersion fiber 50 and a negative dispersion fiber 48. The negative dispersion fiber 48 is connected to the light coupling output 49 and the second fiber signal pump combining unit 47 connected to the assistant light source 46. The positive dispersion fiber 50 is connected to the light coupling output 49 and the pulse pump light source 41 to form a ring cavity.

The negative dispersion fiber 48 generates negative dispersion to make the laser in a differential mode compensate for group velocity, relieving the broadening effect when the outputted ultra short laser passes through the fiber. The positive dispersion fiber 50 can elongate the width of the pulse to prevent passive elements of the amplifier from being damaged due to a massive power peak of the pulse laser. Finally, the wavelength of the laser outputted by the light coupling output 49 ranges from 1010 to 1090 nm. In the embodiment, the wavelength of the laser outputted by the light coupling output 49 is 1035 nm.

In summary, the ring cavity all-fiber-based laser system 40 utilizes the pulse pump light source 41 to generate transient broadband ASE, and the saturable absorber 45 provides passive mode locking. The assistant light source 46 decreases the restoring period of the saturable absorber 45. The dispersion fibers 48 and 50 provide dispersion compensation. Finally, the light coupling output 49 (light coupler) partially outputs the laser. Thus, the embodiment provides an all-fiber-based laser system which can actively control passive mode locking.

Figure 5:
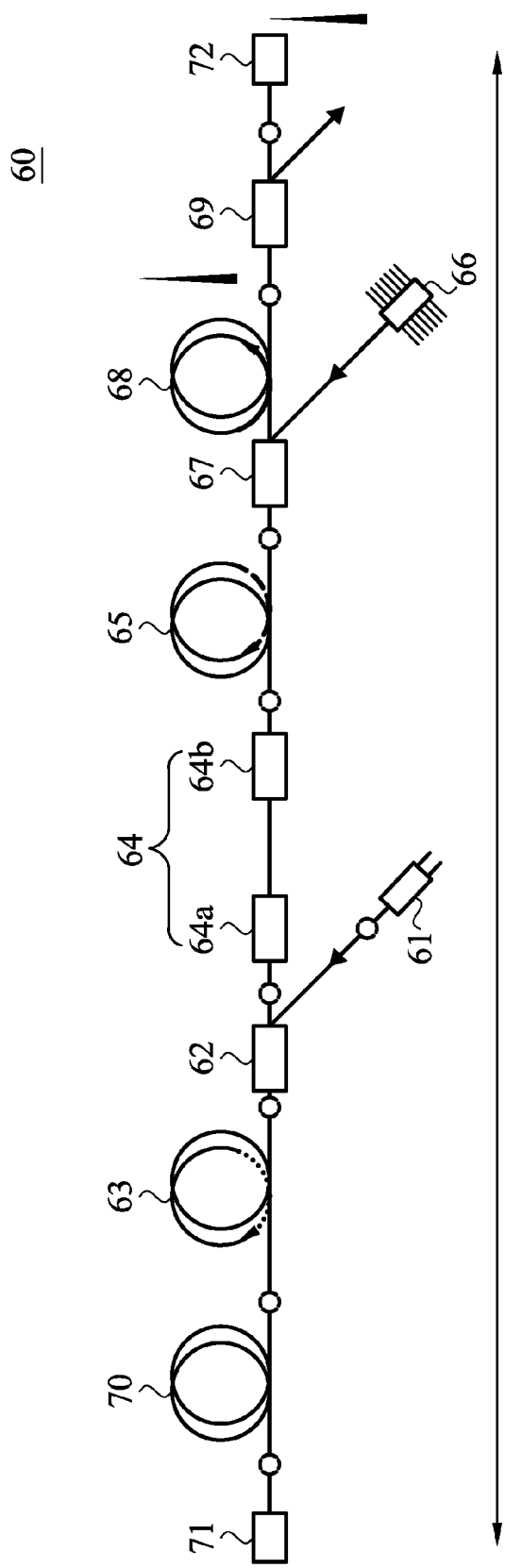
FIG. 5 is a schematic view of a linear-cavity all-fiber-based ultra short pulse laser system.

Referring to FIG. 5, a linear-cavity all-fiber-based ultra short pulse laser system 60 comprises a pulse pump light source 61, a first fiber signal pump combining unit 62, a gain fiber 63, a broadband optical isolator 64, a saturable absorber 65, an assistant light source 66, a broadband high reflective coating 71 and a broadband partial reflective coating 72. The broadband high reflective coating 71, a dispersion fiber 70, the gain fiber 63, the first fiber signal pump combining unit 62, the broadband optical isolator 64, the saturable absorber 65, a second fiber signal pump combining unit 67, a dispersion fiber 68, a light coupling output 69 and the broadband partial reflective coating 72 are linearly connected in sequence. The pulse pump light source 61 is connected to the first fiber signal pump combining unit 62. The assistant light source 66 is connected to the second fiber signal pump combining unit 67. Thus, a linear cavity is generated. In this embodiment, the first fiber signal pump combining unit 62 is a light coupler. The second fiber signal pump combining unit 67 is a wavelength multiplexer. The broadband optical isolator 64 is a Faraday magneto-Optic crystal or the assembly of a multi-mode pump isolator and a low-pass filter. In the embodiment, the broadband optical isolator 64 comprises a multi-mode pump isolator 64a and a low-pass filter 64b to prevent the light from being emitted backwards by the assistant light source and generating broadband ASE.

The pulse pump light source 61 outputs a pump light. The wavelength of the pump light ranges from 790 to 820 nm, from 900 to 930 nm, or 960 to 990 nm. In the embodiment, the wavelength of the pump light is 975 nm. After the pulse pump light source 61 outputs a pump light to pass through the first fiber signal pump combining unit 62 (light coupler) and the gain fiber 63, the pump light arrives the dispersion fiber 70. In the embodiment, the dispersion fiber 70 is a positive dispersion fiber. After the pump light passes through the first fiber signal pump combining unit 62 (light coupler) and the gain fiber 63, the pulse pump light source 61 limits the light-outputting period of the pump light source from about 100 μsec (1/10 of life span of Yb) to 1000 μsec. The photons which do not return in a steady state have the greatest bandwidth of all the photons (having many longitudinal modes and laser levels), thus, the wavelength of the pump light ranges from 1010 to 1070 nm. The wide band ASE with 1035 nm wavelength is an embodiment. Then, the wide band ASE rightward enters the broadband optical isolator 64. The multi-mode pump isolator 64a prevents residuary pump light from entering the saturable absorber 65 and backwardly entering the gain fiber 63. The gain fiber 63 may be an ytterbium (Yb) doped fiber, an erbium (Er) doped fiber, a praseodymium (Pr) doped fiber, a thulium (Tm) doped fiber and a holmium (Ho) doped fiber. In the embodiment, the gain fiber 63 is an ytterbium (Yb) doped fiber.

The embodiment utilizes a high gain Yb doped fiber being the saturable absorber 45 to form passive mode locking. In the spectrum of the high gain Yb doped fiber, the high gain Yb doped fiber with 1035 nm wavelength has a special overlapping character, reaching the threshold of the saturable absorber fiber. At this time, the saturable absorber fiber becomes transparent (that is the loss of the cavity decreases), and emits a steady mode locked ultra short pulse.

The assistant light source 66 is provided to decrease the time of photon on a transient state dropping from the high energy level. The outputted ultra short pulse laser can adjust the repetition of the pulse, and the pulse pump light source 61 and the assistant light source 66 are modulated at the same time to decrease the restoring period of the saturable absorber 65, and decrease the repetition of the pulse. The wavelength of the assistant light source 66 ranges from 1060 to 1100 nm.

In this embodiment, the wavelength of the assistant light source 66 is 1064 nm. The broadband ASE light source signal actively controls the passive mode locking of the cavity. The second fiber signal pump combining unit 67 partially outputs the laser.

The dispersion fiber includes a positive dispersion fiber 70 and a negative dispersion fiber 68. The negative dispersion fiber 68 is connected to the light coupling output 69 and the second fiber signal pump combining unit 67 connected to the assistant light source 66. The positive dispersion fiber 70 is connected to the light coupling output 69 and the first fiber signal pump combining unit 62 connected to the pulse pump light source 61. The linear cavity is generated. In another embodiment, the dispersion fiber comprises a photonic crystal fiber. The photonic crystal fiber is connected to the light coupling output 69 and the first fiber signal pump combining unit 62 connects to the pulse pump light source 61 to form a linear cavity.

The negative dispersion fiber 68 provides negative dispersion and makes the laser to have group velocity compensation for laser pulse compression in time scale. The positive dispersion fiber 70 can elongate the width of the pulse to prevent passive elements of the amplifier from being damaged due to massive power peaks of the pulse laser. Finally, the wavelength of the laser outputted by the light coupling output 69 ranges from 1010 to 1090 nm. In the embodiment, the wavelength of the laser outputted by the light coupling output 69 is 1035 nm. The linear cavity all-fiber-based laser system 60 comprises end portions 71 and 72 with a coating. The broadband high reflective coating 71 and the broadband partial reflective coating 72 form a cavity.

In summary, the linear cavity all-fiber-based laser system 60 utilizes the pulse pump light source 61 to generate transient broadband ASE, and the saturable absorber 65 provides passive mode locking. The assistant light source 66 decreases the restoring period of the saturable absorber 65. The dispersion fibers 68 and 70 provide dispersion compensation. Finally, the light coupling output 69 (light coupler) partially outputs the laser. Thus, the embodiment provides a linear cavity all-fiber-based laser system which can actively control passive mode locking.

Figure 6:
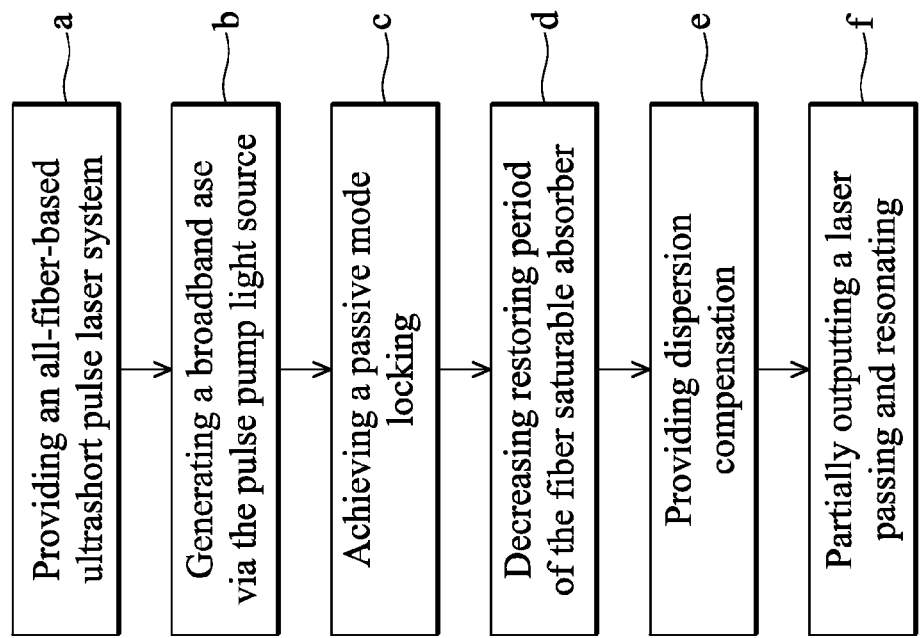
FIG. 6 is a flow chart of operating an all-fiber-based ultra short pulse laser system.

Referring to FIGS. 4, 5 and 6, the steps comprise: providing an all-fiber-based ultra short pulse laser system (including the ring-cavity all-fiber-based ultra short pulse laser system 40 and the linear-cavity all-fiber-based ultra short pulse laser system 60) having pulse pump light sources 41 and 61, fiber saturable absorbers 45 and 65, assistant light sources 46 and 66, dispersion fibers 48, 50, 68 and 70, and light coupling outputs 49 and 69; generating a broadband ASE via the pulse pump light sources 41 and 61; making the all-fiber-based ultra short pulse laser systems 40 and 60 achieve a passive mode locking via the fiber saturable absorbers 45 and 65; decreasing the restoring period of the fiber saturable absorber via the assistant light sources 46 and 66; providing dispersion compensation via the dispersion fibers 48, 50, 68 and 70 to output an ultra short pulse; and partially outputting a laser passing through the all-fiber-based ultra short pulse laser systems 40 and 60 via the light coupling outputs 49 and 69.

In summary, the all-fiber-based laser systems 40 and 60 utilize the pulse pump light sources 41 and 61 to generate transient broadband ASE, and the saturable absorbers 45 and 65 provide passive mode locking. The assistant light sources 46 and 66 decrease the restoring period of the saturable absorbers 45 and 65. The dispersion fibers 48, 50, 68 and 70 provide dispersion compensation. Finally, the light coupling outputs 49 and 69 (light coupler) partially output the laser. Thus, the embodiment provides a method of operating an all-fiber-based ultra short pulse laser system which can actively control passive mode locking.

While the embodiment has been described by way of example and in terms of the embodiments, it is to be understood that the embodiment is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A ring cavity all-fiber-based ultra short pulse laser system, comprising:
   a pulse pump light source;
   a gain fiber;
   a first fiber signal pump combining unit, respectively connected to the pulse pump light source and the gain fiber;
   a broadband optical isolator, connected to the gain fiber;
   a fiber saturable absorber, connected to the broadband optical isolator;
   an assistant light source;
   a second fiber signal pump combining unit, connected to the fiber saturable absorber and the assistant light source; and
   a light coupling output, connected to the second fiber signal pump combining unit.

2. The ring cavity all-fiber-based ultra short pulse laser system as claimed in claim 1, wherein the pulse pump light source emits a pump light, the wavelength of the pump light ranges from 790 to 820 nm, from 900 to 930 nm, or 960 to 990 nm.

3. The ring cavity all-fiber-based ultra short pulse laser system as claimed in claim 2, wherein the wavelength of the pump light is 975 nm.

4. The ring cavity all-fiber-based ultra short pulse laser system as claimed in claim 3, wherein the pump light emitted from the pulse pump light source is isolated by the broadband optical isolator to prevent the pump light from contacting the fiber saturable absorber.

5. The ring cavity all-fiber-based ultra short pulse laser system as claimed in claim 1, wherein the gain fiber comprises an ytterbium (Yb) doped fiber, an erbium (Er) doped fiber, a praseodymium (Pr) doped fiber, a thulium (Tm) doped fiber and a holmium (Ho) doped fiber.

6. The ring cavity all-fiber-based ultra short pulse laser system as claimed in claim 1, wherein the fiber saturable absorber is a high gain ytterbium (Yb) doped fiber.

7. The ring cavity all-fiber-based ultra short pulse laser system as claimed in claim 1, wherein the first fiber signal pump combining unit and the second fiber signal pump combining unit respectively comprises a light coupler and a wavelength multiplexer.

8. The ring cavity all-fiber-based ultra short pulse laser system as claimed in claim 1, further comprising a dispersion fiber, the dispersion fiber comprising a positive dispersion fiber and a negative dispersion fiber, wherein the negative dispersion fiber is connected to the light coupler and the fiber signal pump combining unit connected to the assistant light source, and the positive dispersion fiber is connected to the light coupling output and the fiber signal pump combining unit connected to the pulse pump light source to form a ring cavity.

9. The ring cavity all-fiber-based ultra short pulse laser system as claimed in claim 1, wherein the wavelength of the light coupler ranges from 1010 to 1090 nm.

10. The ring cavity all-fiber-based ultra short pulse laser system as claimed in claim 9, wherein the wavelength of the light coupler is 1035 nm.

11. The ring cavity all-fiber-based ultra short pulse laser system as claimed in claim 1, wherein the wavelength of the assistant light source ranges from 1060 to 1100 nm.

12. The ring cavity all-fiber-based ultra short pulse laser system as claimed in claim 11, wherein the wavelength of the assistant light source is 1064 nm.

13. The ring cavity all-fiber-based ultra short pulse laser system as claimed in claim 1, wherein the gain fiber has an aperture diameter, and the aperture diameter of the gain fiber ranges from 3 μm to 1 mm.

14. The ring cavity all-fiber-based ultra short pulse laser system as claimed in claim 1, wherein the broadband optical isolator is a Faraday magneto-Optic crystal or the assembly of a multi-mode pump isolator and a low-pass filter.

15. The ring cavity all-fiber-based ultra short pulse laser system as claimed in claim 1, wherein when the pulse pump light source illuminates the gain fiber in 100 to 1000 μsec, the wavelength of the gain fiber ranges from 1010 to 1070 nm.

16. The ring cavity all-fiber-based ultra short pulse laser system as claimed in claim 1, wherein the light coupling output is a light coupler.

17. The ring cavity all-fiber-based ultra short pulse laser system as claimed in claim 1, further comprising at least a dispersion fiber, the dispersion fiber comprising a photonic crystal fiber, the photonic crystal fiber connected to the light coupling output and the first fiber signal pump combining unit, and the first fiber signal pump combining unit connected to the pulse pump light source, forming a ring cavity.

* * * * *